(12) United States Patent
Hirose et al.

(10) Patent No.: US 9,929,399 B2
(45) Date of Patent: Mar. 27, 2018

(54) NEGATIVE ELECTRODE ACTIVE MATERIAL, METHOD FOR PRODUCING A NEGATIVE ELECTRODE ACTIVE MATERIAL, AND LITHIUM ION SECONDARY BATTERY

(71) Applicant: SHIN-ETSU CHEMICAL CO., LTD., Tokyo (JP)

(72) Inventors: Takakazu Hirose, Annaka (JP); Hiromichi Kamo, Takasaki (JP); Hiroki Yoshikawa, Takasaki (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 15/028,906

(22) PCT Filed: Jul. 23, 2014

(86) PCT No.: PCT/JP2014/003869
§ 371 (c)(1),
(2) Date: Apr. 12, 2016

(87) PCT Pub. No.: WO2015/063979
PCT Pub. Date: May 7, 2015

(65) Prior Publication Data
US 2016/0254525 A1    Sep. 1, 2016

(30) Foreign Application Priority Data
Oct. 29, 2013  (JP) .................................. 2013-223866

(51) Int. Cl.
*H01M 4/66* (2006.01)
*H01M 4/131* (2010.01)
(Continued)

(52) U.S. Cl.
CPC .......... *H01M 4/131* (2013.01); *H01M 4/0404* (2013.01); *H01M 4/0421* (2013.01);
(Continued)

(58) Field of Classification Search
CPC ...... H01M 4/131; H01M 4/483; H01M 4/485; H01M 4/5825; H01M 10/0525;
(Continued)

(56) References Cited

U.S. PATENT DOCUMENTS 5,395,711 A     3/1995  Tahara et al.
2006/0083987 A1  4/2006  Konishiike et al.
(Continued)

FOREIGN PATENT DOCUMENTS

CN    102214824 A    10/2011
CN    103022438 A    4/2013
(Continued)

OTHER PUBLICATIONS

May 3, 2016 International Preliminary Report on Patentability issued in International Patent Application No. PCT/JP2014/003869.
(Continued)

*Primary Examiner* — Mark F Huff
*Assistant Examiner* — Monique Wills
(74) *Attorney, Agent, or Firm* — Oliff PLC

(57) ABSTRACT

The present invention is a negative electrode active material for a negative electrode active material layer of a lithium ion secondary battery, wherein: the negative electrode active material comprises silicon-based material consisting of $SiO_x$ ($0.5 \leq x \leq 1.6$); and the negative electrode active material has two or more peaks in a region of a bond energy ranging from 520 eV to 537 eV in an O 1s peak shape given in an X-ray photoelectron spectroscopy. As a result, it is possible to provide a negative electrode active material in which a battery capacity can be increased and cycle characteristics (Continued)

and initial charge/discharge characteristics can be improved when used as a negative electrode active material for a lithium ion secondary battery.

17 Claims, 4 Drawing Sheets

(51) Int. Cl.
    *H01M 4/48*     (2010.01)
    *H01M 4/485*     (2010.01)
    *H01M 4/58*     (2010.01)
    *H01M 10/0525*     (2010.01)
    *H01M 4/04*     (2006.01)
    *H01M 4/1391*     (2010.01)
    *H01M 10/054*     (2010.01)
    *H01M 4/02*     (2006.01)

(52) U.S. Cl.
    CPC ....... *H01M 4/0459* (2013.01); *H01M 4/1391* (2013.01); *H01M 4/483* (2013.01); *H01M 4/485* (2013.01); *H01M 4/5825* (2013.01); *H01M 4/661* (2013.01); *H01M 4/662* (2013.01); *H01M 10/054* (2013.01); *H01M 10/0525* (2013.01); *H01M 2004/027* (2013.01); *H01M 2300/0071* (2013.01)

(58) Field of Classification Search
    CPC .... H01M 4/662; H01M 4/661; H01M 4/0459; H01M 4/04212; H01M 4/0404; H01M 2004/027
    See application file for complete search history.

(56) References Cited

U.S. PATENT DOCUMENTS

| | | | |
|---|---|---|---|
| 2006/0099507 A1 | 5/2006 | Kogetsu et al. | |
| 2008/0176137 A1 | 7/2008 | Endo et al. | |
| 2009/0047577 A1 | 2/2009 | Iwamoto et al. | |
| 2009/0075173 A1 | 3/2009 | Jeong et al. | |
| 2009/0202911 A1 | 8/2009 | Fukuoka et al. | |
| 2011/0244328 A1 | 10/2011 | Iriyama et al. | |
| 2011/0244333 A1 | 10/2011 | Kawada | |
| 2013/0078490 A1* | 3/2013 | Morita .................. | H01M 4/133 429/92 |
| 2014/0076729 A1 | 3/2014 | Iriyama et al. | |

FOREIGN PATENT DOCUMENTS

| | | |
|---|---|---|
| EP | 2372817 A1 | 10/2011 |
| JP | H06-325765 A | 11/1994 |
| JP | 2997741 B2 | 1/2000 |
| JP | 2001-185127 A | 7/2001 |
| JP | 2002-042806 A | 2/2002 |
| JP | 2002-237333 A | 8/2002 |
| JP | 2006-114454 A | 4/2006 |
| JP | 2006-164954 A | 6/2006 |
| JP | 2007-059213 A | 3/2007 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-026491 A | 2/2009 |
| JP | 2009-070825 A | 4/2009 |
| JP | 2009-76372 A | 4/2009 |
| JP | 2009-205950 A | 9/2009 |
| JP | 2009-212074 A | 9/2009 |
| JP | 2011-113862 A | 6/2011 |
| JP | 2011-222151 A | 11/2011 |
| JP | 2011-222153 A | 11/2011 |
| JP | 2012-256539 A | 12/2012 |
| JP | 2013-110105 A | 6/2013 |
| JP | 2013-197012 A | 9/2013 |
| JP | 2013-251097 A | 12/2013 |
| WO | 2007-063765 A1 | 6/2007 |
| WO | 2010/071166 A1 | 6/2010 |
| WO | 2012/132387 A1 | 10/2012 |
| WO | 2012-165049 A1 | 12/2012 |

OTHER PUBLICATIONS

Sep. 16, 2014 International Search Report issued in International Patent Application No. PCT/JP2014/003869.

Kobayashi, K. et.al, "High resolution-high energy x-ray photoelectron spectroscopy using third-generation synchrotron radiation source, and its application to Si-high k insulator systems," Applied Physics Letters, vol. 83, No. 5, Aug. 2003, pp. 1005-1007.

Watanabe, Hidetoshi et al., "Depth Profiling of Perhydoropolysilazane Thin Film Using Multi Anode XPS Technique," Journal of Surface Analysis, vol. 15, No. 3, 2009, pp. 309-311.

Kwoka, M. "XPS study of the surface chemistry of L-CVD SnO2 thin films after oxidization," Science Direct, Thin Solid Films 490, 2005, pp. 36-42.

Aug. 1, 2017 Office Action issued in Chinese Application No. 2014800598672.

Hideharu Takezawa et al., "Electrochemical behaviors of nonstoichiometric silicon suboxides (SIOx) film prepared by reactive evaporation for lithium rechargeable batteries," Journal of Power Sources 244 (2013), pp. 149-157.

May 23, 2017 Office Action issued in Japanese Application No. 2014-164177.

\* cited by examiner

NEGATIVE ELECTRODE ACTIVE MATERIAL, METHOD FOR PRODUCING A NEGATIVE ELECTRODE ACTIVE MATERIAL, AND LITHIUM ION SECONDARY BATTERY

BACKGROUND OF THE INVENTION

1. Field of the Invention

The present invention relates to a negative electrode active material that can absorb and emit a lithium ion, a method for producing this negative electrode active material, and a lithium ion secondary battery having a negative electrode using this negative electrode active material.

2. Description of the Related Art

With the widespread diffusion of small-sized electronic devices such as a mobile terminal in recent years, further miniaturization, weight saving, and life-elongation of devices are highly required. For these market demands, development of secondary battery is proceeding, in particular a small-sized, light weight one which can achieve a high energy density.

This secondary battery is also evaluated to apply to large-sized electronic devices such as an automobile, electricity storage systems such as a house, not only to small-sized electronic devices.

Among them, lithium ion secondary battery is greatly expected, since it is easy to achieve small-size and high capacity in the lithium ion secondary battery, and higher energy density can be obtained in the lithium ion secondary battery compared to a lead battery or a nickel-cadmium battery.

A lithium ion secondary battery described above is provided with a positive electrode and a negative electrode, a separator and an electrolytic solution. The negative electrode contains a negative electrode active material which participates in charge/discharge reaction.

As this negative electrode active material, carbon materials are widely used, whereas further improvement of a battery capacity is required due to the recent market demand.

It has been evaluated to use silicon as a negative electrode active material in order to improve a battery capacity. Because the theoretical capacity of silicon (4199 mAh/g) is larger than the theoretical capacity of graphite (372 mAh/g) by more than ten times, and therefore large improvement of a battery capacity can be expected.

The development of a silicon material as a raw material for a negative electrode active material is not limited to silicon simple substance, but alloys and compounds such as oxides are also evaluated.

Further, as the shapes of a negative electrode active material, application type which is standard in carbon materials or built-in type which is directly deposited on a current collector are evaluated.

However, when silicon is used as a main raw material for a negative electrode active material, the negative electrode active material expands/contracts during charge/discharge, and therefore breakage is liable to occur mainly in the vicinity of the negative electrode active material surface. Further, an ionic material is formed in an active material, and the negative electrode active material liable to break.

When a surface layer of a negative electrode active material break, a new surface is formed thereby, and the reaction area of an active material increases. At this time, the decomposition reaction of an electrolytic solution occurs at the new surface and the new surface is covered with a coat of a decomposition material of the electrolytic solution, and therefore the electrolytic solution is consumed. Accordingly the cycle characteristics is liable to deteriorate.

It has been evaluated various investigations heretofore regarding a negative electrode material for a lithium ion secondary battery mainly consists of silicon material or arrangement of electrodes in order to improve initial battery efficiency or cycle characteristics.

Concretely, silicon and amorphous silicon dioxide are simultaneously deposited by vapor-phase method in order to obtain excellent cycle characteristics or high safety (see patent literature 1, for example). Moreover, a particle of silicon oxide is provided with a carbon material (an electron conductive material) on its surface layer in order to obtain high battery capacity or high safety (see patent literature 2, for example).

Further, an active material containing silicon and oxygen is prepared, and an active material layer in which the oxygen ratio is high in the vicinity of the current collector in order to improve cycle characteristics and obtain high input/output characteristics (see patent literature 3, for example).

Moreover, oxygen is contained in a silicon active material, in which the mean oxygen content is 40 at % or less and is formed so as to increase the oxygen content in the vicinity of the current collector in order to improve cycle characteristics (see patent literature 4, for example).

Further, nano composite containing a Si phase, $SiO_2$, $M_yO$ metal oxide is used in order to improve initial charge/discharge efficiency (see patent literature 5, for example).

Moreover, $SiO_x$ ($0.8 \leq x \leq 1.5$, a particle size range=1 μm to 50 μm) and a carbon material are mixed and fired at high temperature in order to improve cycle characteristics (see patent literature 6, for example).

Further, a molar ratio of oxygen to silicon in a negative electrode active material is set to 0.1 to 1.2 and an active material is controlled in a range of the difference between the maximum and the minimum of the molar ratio in the vicinity of the interface of the active material and a current collector is 0.4 or less in order to improve cycle characteristics (see patent literature 7, for example).

Moreover, metal oxide containing lithium is used in order to improve battery loading characteristics (see patent literature 8, for example).

Further, a hydrophobic layer such as silane compound is formed on a silicon material surface layer in order to improve cycle characteristics (see patent literature 9, for example).

Moreover, conductivity is given by using silicon oxide and forming a graphite coat thereon in order to improve cycle characteristics (see patent literature 10, for example). In patent literature 10, broad peaks appeared at 1330 $cm^{-1}$ and 1580 $cm^{-1}$ in a shift value of RAMAN spectrum regarding graphite coat, and their intensity ratio $I_{1330}/I_{1580}$ is in the range of $1.5 < I_{1330}/I_{1580} < 3$.

Further, a particle containing a silicon microcrystalline phase dispersed in silicon oxide is used in order to obtain a high battery capacity and improve cycle characteristics (see patent literature 11, for example).

Moreover, silicon oxide in which a molar ratio of silicon atom and oxygen atom is controlled to 1:y ($0 < y < 2$) is used in order to improve overcharge/overdischarge characteristics (see patent literature 12, for example).

CITATION LIST

Patent Literature

Patent Literature 1: Japanese Unexamined Patent Application Publication (Kokai) No. 2001-185127

Patent Literature 2: Japanese Unexamined Patent Application Publication (Kokai) No. 2002-042806

Patent Literature 3: Japanese Unexamined Patent Application Publication (Kokai) No. 2006-164954

Patent Literature 4: Japanese Unexamined Patent Application Publication (Kokai) No. 2006-114454

Patent Literature 5: Japanese Unexamined Patent Application Publication (Kokai) No. 2009-070825

Patent Literature 6: Japanese Unexamined Patent Application Publication (Kokai) No. 2008-282819

Patent Literature 7: Japanese Unexamined Patent Application Publication (Kokai) No. 2008-251369

Patent Literature 8: Japanese Unexamined Patent Application Publication (Kokai) No. 2008-177346

Patent Literature 9: Japanese Unexamined Patent Application Publication (Kokai) No. 2007-234255

Patent Literature 10: Japanese Unexamined Patent Application Publication (Kokai) No. 2009-212074

Patent Literature 11: Japanese Unexamined Patent Application Publication (Kokai) No. 2009-205950

Patent Literature 12: Japanese Patent No. 2997741

SUMMARY OF THE INVENTION

As described above, small-sized mobile devices represented by electronic devices have been advancing recently toward high performance and multifunction, and a lithium ion secondary battery that is main electric source thereof, is required to improve a battery capacity.

As a technique to solve this problem, it is desired to develop a lithium ion secondary battery containing a negative electrode using a silicon material as a main material.

Further, for a lithium ion secondary battery using a silicon material, it is desired to show a cycle characteristics almost equivalent to that of a lithium ion secondary battery using a carbon material.

However, it is not reached the stage to propose a negative electrode active material which shows a cycle stability equivalent to that of a lithium ion secondary battery using a carbon material.

The present invention was performed in view of the above-described problems, and it is an object of the present invention to provide a negative electrode active material in which a battery capacity can be increased, and cycle characteristics and initial charge/discharge characteristics can be improved when used as a negative electrode active material for a lithium ion secondary battery, a method for producing this negative electrode active material and a lithium ion secondary battery having a negative electrode using this negative electrode active material.

In order to achieve the object, according to the present invention, there is provided a negative electrode active material for a negative electrode active material layer of a lithium ion secondary battery, wherein: the negative electrode active material comprises silicon-based material consisting of $SiO_x$ (0.5≤x≤1.6); and the negative electrode active material has two or more peaks in a region of a bond energy ranging from 520 eV to 537 eV in an O 1s peak shape given in an X-ray photoelectron spectroscopy.

By using such silicon-based material with the composition ratio and the two or more peaks described above, a high battery capacity as well as excellent cycle characteristics and excellent initial charge/discharge characteristics can be obtained when the negative electrode active material which contains this silicon-based material is used as a negative electrode active material for a lithium ion secondary battery.

It is preferable that the two or more peaks are be the peaks attributable to two or more compounds selected from $SiO_2$, $Li_4SiO_4$, $Li_2SiO_3$, $Li_2O$, $Li_2CO_3$, $Li_2Si_2O_5$, and $Li_2Si_2O_3$.

The silicon-based material with such a constitution can be preferably used.

It is preferable that the negative electrode active material has a peak in the chemical shift region of from 15 to 50 ppm given in a $^7$Li-MAS-NMR spectrum at a state of constant current and constant voltage charge reached 0 V (the charge is finished in 70 hours) in at least a single point during a constant current and constant voltage charge reached 0 V and a constant current discharge reached 1.5 V are repeated for 50 cycles when the negative electrode active material is used to a lithium ion secondary battery.

By using the negative electrode active material with such a constitution, more excellent cycle characteristics can be obtained.

It is preferable for the negative electrode active material that the peak intensity A of a peak shown in a region of a bond energy ranging from 90 eV to 105 eV and the peak intensity B of a peak shown in a region of a bond energy of 106 eV or more in a Si 2p peak shape given in an X-ray photoelectron spectroscopy of the negative electrode active material satisfy a relationship that 0.3≤A/B≤3.

By using the negative electrode active material with such a peak intensity ratio, more excellent cycle characteristics and more excellent initial charge/discharge characteristics can be obtained.

It is particularly preferable that the peak intensity A and the peak intensity B satisfy a relationship that 0.5≤A/B≤2.

By using the negative electrode active material with such a peak intensity ratio, much more excellent initial charge/discharge characteristics can be obtained.

It is preferable that the negative electrode active material contains $Li_2SiO_3$, and the full width at half maximum (2θ) of a diffraction peak near 38.2680° in an X-ray diffraction due to $Li_2SiO_3$ is 0.75° or more.

When the negative electrode active material contains the Li compound with such a crystallinity, more excellent cycle characteristics and more excellent initial charge/discharge characteristics can be obtained.

It is preferable that the negative electrode active material contains $Li_4SiO_4$, and the full width at half maximum (2θ) of a diffraction peak near 23.9661° in an X-ray diffraction due to $Li_4SiO_4$ is 0.2° or more.

When the negative electrode active material contains the Li compound with such a crystallinity, more excellent cycle characteristics and more excellent initial charge/discharge characteristics can be obtained.

It is preferable that the Li compounds giving the two or more peaks are substantially amorphous.

When the particle of negative electrode active material contains two or more amorphous Li compounds, more excellent cycle characteristics and more excellent initial charge/discharge characteristics can be obtained.

It is preferable that the negative electrode active material has a diffraction peak attributable to Si(111) crystal face in which the full width at half maximum (2θ) is 1.2° or more in an X-ray diffraction, and the size of the crystallite corresponding to the crystal face is 7.5 nm or less.

When the negative electrode active material has such a crystallinity, more excellent cycle characteristics and more excellent initial charge/discharge characteristics can be obtained.

Further, according to the present invention, there is provided a method for producing the negative electrode active material of the present invention comprising a process of reforming the silicon-based material using an electrochemical method.

This producing method can produce a negative electrode active material with a high battery capacity as well as excellent cycle characteristics and initial charge/discharge characteristics when it is used as a negative electrode active material for a lithium ion secondary battery by including the process of reforming the silicon-based material using an electrochemical method.

It is preferable that the process of reforming includes a stage of inserting Li into the silicon-based material with conducting electric potential regulation and electric current regulation.

The silicon-based material can be effectively reformed in this way.

It is preferable that the process of reforming further includes a stage of eliminating the inserted Li partially from the silicon-based material with conducting electric potential regulation and electric current regulation.

By reforming as described above, a negative electrode active material with more excellent cycle characteristics and more excellent initial charge/discharge characteristics when it is used as a negative electrode active material for a lithium ion secondary battery, can be produced.

It is particularly preferable that each of the stage of inserting Li and the stage of eliminating Li partially is repeated for plural times.

By reforming as described above, a negative electrode active material with much more excellent initial charge/discharge characteristics when it is used as a negative electrode active material for a lithium ion secondary battery, can be produced.

It is preferable to use one or more material selected from Li metal, lithium chloride, lithium carbonate, lithium oxide, and lithium composite oxide as the Li source used for inserting Li.

The above materials can be preferably used as the Li source used for inserting Li.

It is preferable that the method further includes a process of vapor phase growing the silicon-based material on a metal current collector with the surface being roughened; and the process of reforming is a process of reforming the silicon-based material formed on the metal current collector using electrochemical method.

It is possible to produce a negative electrode active material with much more excellent cycle characteristics when it is used as a negative electrode active material for a lithium ion secondary battery by reforming the silicon-based material formed on a metal current collector through vapor phase growth with using an electrochemical method.

Furthermore, according to the present invention, there is provided a lithium ion secondary battery comprising a negative electrode including a negative electrode current collector and the negative electrode active material layer containing the negative electrode active material of the above present invention.

In the lithium ion secondary battery using a negative electrode containing such a negative electrode active material, a high battery capacity as well as excellent cycle characteristics and excellent initial charge/discharge characteristics can be obtained.

As was described above, according to the negative electrode active material of the present invention, a high capacity as well as excellent cycle characteristics and initial charge/discharge characteristics can be obtained when used as a negative electrode active material for a lithium ion secondary battery. Moreover, according to the method for producing a negative electrode active material of the present invention, it is possible to produce a negative electrode active material for a lithium ion secondary battery with excellent cycle characteristics and initial charge/discharge characteristics.

DETAILED DESCRIPTION OF THE PREFERRED EMBODIMENTS

Hereinafter, the present invention will be detailed as an example of an embodiment with referring figures. However, the present invention is not limited thereto.

As described above, it has been studied to use a negative electrode mainly consists of silicon material as a negative electrode for a lithium ion secondary battery as a technique for increasing a battery capacity of a lithium ion secondary battery.

Although it has been desired that this lithium ion secondary battery using silicon material shows cycle characteristics almost equivalent to a lithium ion secondary battery using carbon material, it is not reached the stage to propose a negative electrode active material which shows a cycle stability equivalent to a lithium ion secondary battery using carbon material.

Therefore, the present inventors have studied earnestly negative electrode active materials in which excellent cycle characteristics can be obtained when used as a negative electrode of a lithium ion secondary battery.

As a result thereof, the present inventors have found that by using silicon-based material with the composition ratio of $SiO_x$ ($0.5 \leq x \leq 1.6$) and with two or more peaks in a region of a bond energy ranging from 520 eV to 537 eV in an O 1s peak shape given in an X-ray photoelectron spectroscopy, excellent cycle characteristics and excellent initial charge/discharge characteristics are obtained when a negative electrode active material which contains the silicon-based material is used as a negative electrode active material of a lithium ion secondary battery.

<A Negative Electrode for a Lithium Ion Secondary Battery>

First, a negative electrode for a lithium ion secondary battery will be explained.

Figure 1:
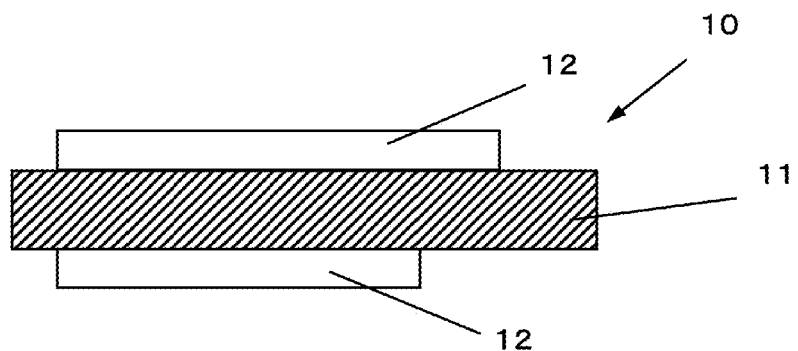
FIG. 1 is a schematic cross-sectional view of the constitution of the negative electrode for a lithium ion secondary battery of the present invention.
Figure 2:
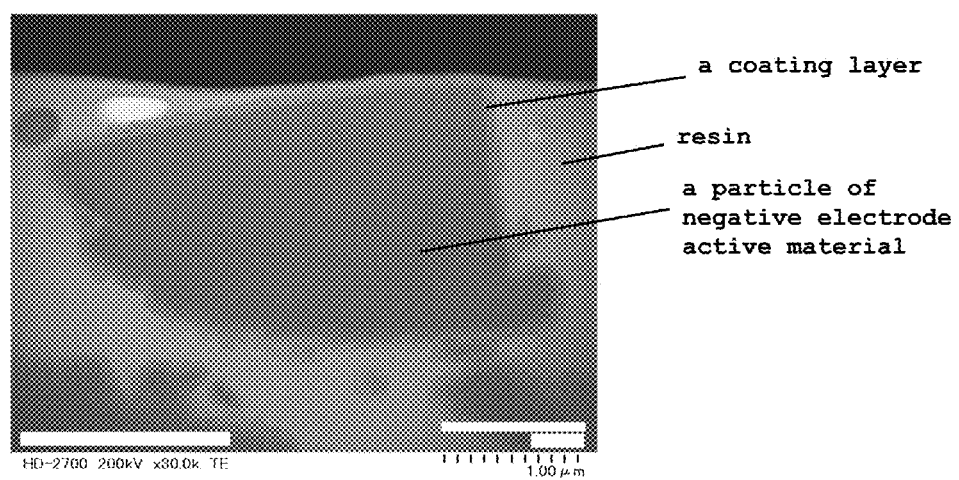
FIG. 2 is a TEM photograph showing the cross-sectional structure of the negative electrode active material.

FIG. 1 shows a cross-sectional constitution of the negative electrode for a lithium ion secondary in an embodiment of the present invention (hereinafter, described as "negative electrode"), and FIG. 2 is a TEM (Transmission Electron Microscope) photograph showing the cross-sectional structure of the negative electrode active material.

[The Constitution of the Negative Electrode]

As shown in FIG. 1, a negative electrode 10 is constituted to have a negative electrode active material layer 12 on a negative electrode current collector 11. In addition, the negative electrode active material layer 12 may be provided either on both sides or on only one side of the negative electrode current collector 11. Further, the negative electrode current collector 11 may be eliminated if the negative electrode active material of the present invention is used.

[The Negative Electrode Current Collector]

The negative electrode current collector 11 is constituted of material with excellent conductivity and a large mechanical strength. As conductive material, copper (Cu) or nickel (Ni) are illustrated, for example.

Incidentally, this conductive material is preferably a material which does not form an intermetallic compound with lithium (Li).

It is preferable that the negative electrode current collector 11 contains carbon (C) or sulfur (S) other than the main elements. Since it improves a physical strength of the negative electrode current collector 11.

Especially, when the negative electrode has an active material layer which expands during charge there arises an effect to suppress a deformation of the electrode including the current collector if the current collector contains the above elements.

Although the contents of the above contained-elements are not particularly limited, it is preferred to be 100 ppm or less, since higher deformation-suppressing effect can be obtained.

Moreover, the surface of the negative electrode current collector 11 may be roughened or not be roughened. Illustrative examples of the negative electrode current collector which surface is roughened includes metal foil which is treated by electrolysis, embossing, or chemically etching. Illustrative examples of the negative electrode current collector which surface is not roughened includes rolling metal foil.

[The Negative Electrode Active Material Layer]

The negative electrode active material layer 12 contains plural of particulate negative electrode active material (hereinafter, referred as "a particle of negative electrode active material") which can absorb/emit lithium ions, and may contain other materials such as a negative electrode binder (binder) or a conductive assistant agent from the viewpoint of battery design.

When the above roughened foil is used as a negative electrode current collector, it is possible to form the negative electrode active material layer directly on the negative electrode current collector. In this case, a vapor phase method such as a vapor deposition method and a CVD method is desirable, although the forming method is not particularly limited.

The particle of negative electrode active material is composed of a core part which can absorb/emit lithium ions and a Li compound formed at least on the surface of the active material or in the active material.

The particle of negative electrode active material is silicon oxide material containing silicon-based material ($SiO_x$: $0.5 \leq x \leq 1.6$), and it is preferable that "x" is near to 1 as the composition of a silicon-based material, since higher cycle characteristics can be obtained.

In addition, the silicon-based material in the present invention is not necessarily meaning 100% of purity, and may contain a slight contents of impurity elements.

The silicon-based material gives stabilized battery property when the silicon-based material contains two or more compound state in a region of a bond energy ranging from 520 eV to 537 eV in an O 1s peak shape given in an X-ray photoelectron spectroscopy (i.e., having two or more peaks in the above region).

Figure 5:
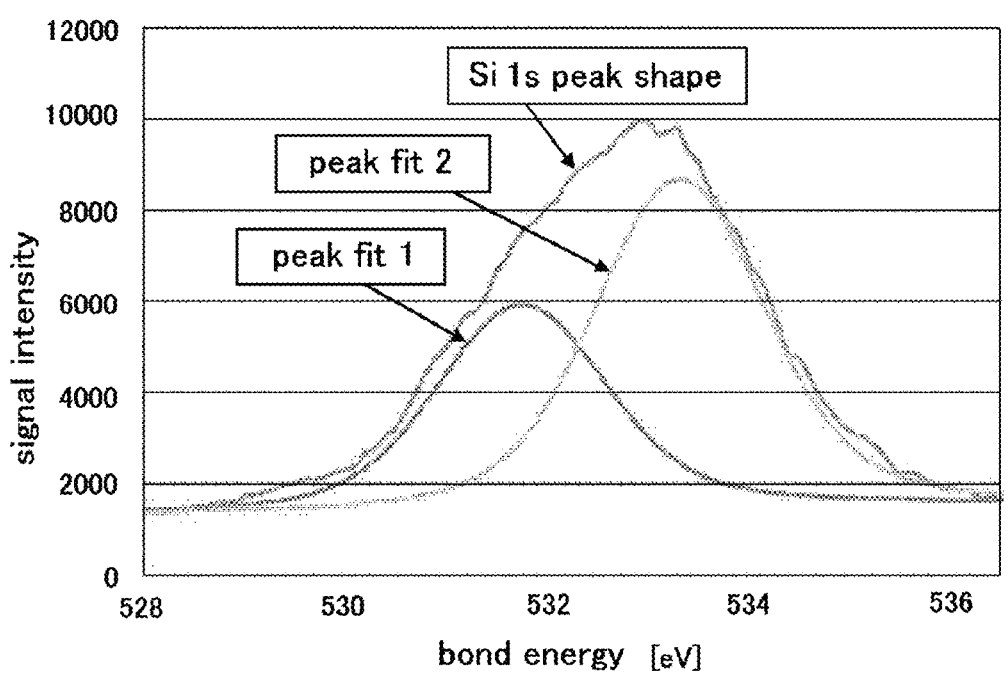
FIG. 5 is a figure showing an O 1s peak shape given in an X-ray photoelectron spectroscopy.

FIG. 5 shows an example of O 1s peak shape given in an X-ray photoelectron spectroscopy. As shown in FIG. 5, when a peak of O 1s peak shape has an asymmetrical shape, it contains two peaks and can be resolved into the first peak shown by the peak fit 1 and the second peak shown by the peak fit 2.

In the measurement of O 1s peak shape by an X-ray photoelectron spectroscopy, an X-ray photoelectron spectroscope was used under the following conditions: monochromatic Al Kα ray as an X-ray source, 100 μm of an X-ray spot diameter, 0.5 to 3.0 kV/2 mm×2 mm of an Ar ion gun spatter condition.

A part of $SiO_2$ component formed in a silicon oxide can be converted to a Li compound selectively when two or more peaks belong to within the above region.

It is preferable that the two or more peaks are attributed to two or more compounds selected from $SiO_2$, $Li_4SiO_4$, $Li_2SiO_3$, $Li_2O$, $Li_2CO_3$, $Li_2Si_2O_5$, and $Li_2Si_2O_3$.

Among them, particularly excellent property can be obtained when the two or more peaks are the peaks attributable to two or more compounds selected from $Li_4SiO_4$, $Li_2SiO_3$, $Li_2CO_3$ and $Li_2O$.

As a method for producing the selective compounds (Li compounds), it is preferable to use an electrochemical method.

It is possible to produce the selective compounds by modifying conditions such as electric potential regulation or electric current regulation to a lithium counter electrode in an electrochemical method. Moreover, the selective compounds can be more dense substances by drying them under carbon dioxide atmosphere or oxygen atmosphere and the like after they were produced by an electrochemical method.

In the reforming using electrochemical method, plural times of lithium insertion and partially elimination allows more stable formation of a material than one time of lithium insertion and partially elimination, although the number of times is not particularly limited. In this case, the insertion electric potential and electric current, the elimination electric potential and electric current, and the reforming number of times have close relationships with an improvement of a property of a negative electrode active material.

Moreover, it is possible to lower or avoid modification to Li compounds in Si area by using the method described above, and to make the substance stable in the atmosphere, aqueous slurry, or solvent slurry.

Furthermore, it is possible to make more stable substance by the method described above compared to thermal reforming in which random generation of compounds are proceeded.

A surface treatment method performed on the outermost layer of an active material is effective especially for the stability in aqueous or solvent slurry. As the surface treatment method, water-resistant material, water-repellent material, or hydrophobic material may cover at least a part of the surface. As the material, a fluorine compound is effective, and other material such as silazanes, siloxanes, silanes, metal, metal oxide are easy to apply, although the material is not particularly limited.

At least one of $Li_4SiO_4$, $Li_2SiO_3$, and $Li_2CO_3$ generated in the bulk improves the property, but coexistence of two or more of the Li compounds further improve the property.

It is preferable that the silicon material is a material in which a peak in the chemical shift region of from 15 to 50 ppm given in a $^7$Li-MAS-NMR spectrum is generated at a state of constant current and constant voltage charge reached 0 V (the charge is finished in 70 hours) in at least a single point during a constant current and constant voltage (cccv) charge reached 0 V and a constant current (cc) discharge reached 1.5 V are repeated for 50 cycles in a battery using a lithium counter electrode. Since it generates a stable Li compound which contribute to charge/discharge in initial cycles.

Wherein, the constant current and constant voltage charge reached 0 V means to charge in a constant current mode (current density: 0.2 mA/cm$^2$) until 0 V, followed by changing to a constant voltage mode from 0 V, and terminating the charge at a current density of 0.05 mA/cm$^2$.

On the other hand, the constant current discharge reached 1.5 V means to discharge in a constant current mode (current density: 0.2 mA/cm$^2$) after a completion of a charge, followed by terminating the discharge at a potential of 1.5 V.

Incidentally, in measuring a $^7$Li-MAS-NMR spectrum, 700 NMR spectroscope made by Bruker Co. Ltd. was used as an apparatus, 4 mm HR-MAS rotor 50 μL was used as a probe, rotating speed of a sample was set to 10 kHz, and the measuring environment temperature was set to 25° C.

It is suggested that the peak in the chemical shift region of from 15 to 50 ppm given in a $^7$Li-MAS-NMR spectrum is attributable to a Li compound.

However, Li$_4$SiO$_4$ reagent and Li salt reagents give a peak at about 0 ppm in a $^7$Li-MAS-NMR spectrum.

As described above, from the peak shape given in an X-ray photoelectron spectroscopy, Li compound is listed as a compound for this material.

In view of these, it is suggested that the valence number or the coordination number of this material can be different from those of Li$_4$SiO$_4$ and Li salt marketed as ordinary reagents.

It is preferable for the silicon material that the peak intensity A of a peak shown in a region of a bond energy ranging from 90 eV to 105 eV (position of low bond energy) and the peak intensity B of a peak shown in a region of a bond energy of 106 eV or more (position of high bond energy) in a Si 2p peak shape given in an X-ray photoelectron spectroscopy satisfy a relationship that $0.3 \leq A/B \leq 3$. When the ratio of the peak intensities is in the above range, more stable battery property can be obtained.

Especially, it is more preferable that the ratio of the peak intensities which satisfy a relationship that $0.5 \leq A/B \leq 2$, since the property is more improved in this case.

In a range in which a peak value is high (position of high bond energy), a state of high valence number of Si is mainly selected. While a state of a Li compound was described on the basis of O 1s peak shape, further stabilization is obtained especially when a state of high valence number of Si is selectively decreased and is reformed to a Li compound.

It is preferable that the Li compound, Li$_2$SiO$_3$ or Li$_4$SiO$_4$ generated in the bulk preferably has a lower crystallinity, and it is particularly preferable that the Li compound is amorphous. This is because higher crystallinity increases a resistivity of a negative electrode active material.

Specifically, it is preferable that the full width at half maximum (2θ) of a diffraction peak near 38.2680° in an X-ray diffraction due to Li$_2$SiO$_3$ is 0.75° or more.

When a particle of negative electrode active material contains a Li compound with such crystallinity, more excellent cycle characteristics and initial charge/discharge characteristics can be obtained.

Moreover, it is preferable that the full width at half maximum (2θ) of a diffraction peak near 23.9661° in an X-ray diffraction due to Li$_4$SiO$_4$ is 0.2° or more.

When a particle of negative electrode active material contains a Li compound with such crystallinity, more excellent cycle characteristics and more excellent initial charge/discharge characteristics can be obtained.

Regarding the crystallinity of the negative electrode active material, the lower the better. It is desirable that a full width at half maximum (2θ) of a diffraction peak in an X-ray diffraction attributable to Si(111) crystal face is 1.2° or more together with the size of the crystallite corresponding to the crystal face is 7.5 nm or less. In particular, the existence of Si crystal deteriorates battery property, and further, it comes to difficult to generate a Li compound stably.

Although a median diameter of particle of the negative electrode active material is not particularly limited, 0.5 μm to 20 μm is preferable. Since when the median diameter is in the above range, lithium ion can be easily absorbed and emitted during charge/discharge, and the particle is hard to brake.

In a smaller particle diameter, the surface is increased and thereby irreversible battery capacity tends to increase. On the other hand, when the median diameter is too large, there arise possibilities that the particle tends to brake and a new surface is tends to form.

As the negative electrode binder, any one or more of polymer material, synthetic rubber, and so on are usable, for example.

Illustrative examples of the polymer material includes polyvinylidene fluoride, polyimide, polyamideimide, aramid, polyacrylic acid, lithium polyacrylate, carboxymethyl cellulose.

Illustrative examples of the synthetic rubber includes styrene-butadiene rubber, fluororubber, ethylene-propylene-diene.

As the negative electrode conductive assistant agent, any one or more of a carbon material, such as carbon black, acetylene black, graphite, ketjen black, carbon nanotube, carbon nanofiber can be used.

The negative electrode active material layer 12 may be prepared in a mixed state with a carbon material. This can lower electric resistance of the negative electrode active material layer 12 and reduce expansion stress accompanying with charge. Illustrative examples of this carbon material include thermally decomposed carbons, cokes, glassy carbon fiber, fired organic polymer compound, carbon black, etc.

The negative electrode active material layer 12 is formed by an application method, for example. The application method is a method in which the particle of negative electrode active material is mixed with the above binder and so on, optionally with a conductive assistant agent or a carbon material, and then dispersed to organic solvent, water, or the like so as to be applied.

As the method for bulk reforming, an electrochemical method is desirable. Since it is possible to generate a Li compound selectively by using electric potential regulation and electric current regulation.

When an electrochemical method is used as the method for bulk reforming, it is preferable to include a process of eliminating reversible Li from the bulk. Since the stability of the bulk is more improved.

Moreover, when an electrochemical method is used as the method for bulk reforming, it is preferable to conduct an insertion and an elimination of Li. In particular, by conducting insertions and eliminations of Li for plural of times, an excellent coating can be obtained on the surface of the bulk.

Although the Li source used for inserting Li in the electrochemical method is not particularly limited, it is preferable to use Li metal, lithium chloride, lithium carbonate, lithium oxide, and lithium composite oxide as the Li source.

As the Li source, lithium composite oxide is particularly desirable. Since it gives high rate characteristics and environmental stability.

It is possible to recycle the lithium composite oxide used as the Li source that is used in the Li insertion.

In particular, the oxide in which Li has been eliminated during the bulk reforming can be recycled by mixing with, for example, lithium carbonate and then being calcined.

Moreover, use of the electrode in which the negative electrode active material layer is directly formed onto a copper foil using a vapor phase method improves the property. Since current collecting characteristics and the structure of the active material are stabilized.

[The Method for Producing a Negative Electrode]

The negative electrode 10 is produced by the following procedure, for example.

First, a raw material which generates silicon oxide gas is heated in a temperature range of 900° C. to 1600° C. in a reduced pressure under an inert atmosphere to generate silicon oxide gas. In this case, the raw material is a mixture of metal silicon powder and silicon dioxide powder, and the molar ratio of the mixture is preferably in a range of 0.8<metal silicon powder/silicon dioxide powder<1.3 with considering the existence of surface oxygen on the metal silicon powder and slight oxygen in a reaction furnace.

Then, the generated gas is solidified and deposited on an absorbing plate.

Next, the deposit is taken out under the condition of the temperature in the reaction furnace of 100° C. or below, and then ground and powdered using a ball mil, a jet mil, or the like.

Incidentally, a Si crystallite in a particle is controlled by changing a vaporization temperature or thermal treatment after the generation.

It is possible to form an electrode directly by changing the absorbing plate to a copper foil. The copper foil to be used is desirable to be traveled via a can roll.

Then, a carbon layer is preferably formed onto a surface layer of the obtained silicon oxide powder material. As a method for forming the carbon material layer, a thermal decomposition CVD method is desirable.

It will be explained below on a method for forming the carbon material layer by thermal decomposition CVD method.

First, silicon oxide powder is set in a furnace.

Then, hydrocarbon gas is introduced into the furnace, and the temperature of the furnace is raised.

Although the decomposition temperature is not particularly limited, 1200° C. or below is desirable and 950° C. or below is more desirable. By setting the decomposition temperature at 1200° C. or below, disproportionation of an active material particle can be suppressed.

After the furnace temperature is raised to a certain temperature, the carbon layer is formed on the silicon oxide powder.

The hydrocarbon gas is not particularly limited, but in a composition of $C_nH_m$, $n \leq 3$ is desirable. When $n \leq 3$, the producing cost can be lowered, and the property of the decomposition product can be improved.

Then the silicon oxide powder is subjected to an inner-bulk reforming.

It is desirable to insert Li electrochemically in the inner-bulk reforming. In this case, inner-bulk generating substance can be controlled by adjusting insertion electric potential or elimination electric potential, or changing electric current density, bath temperature, or insertion and elimination times.

Figure 4:
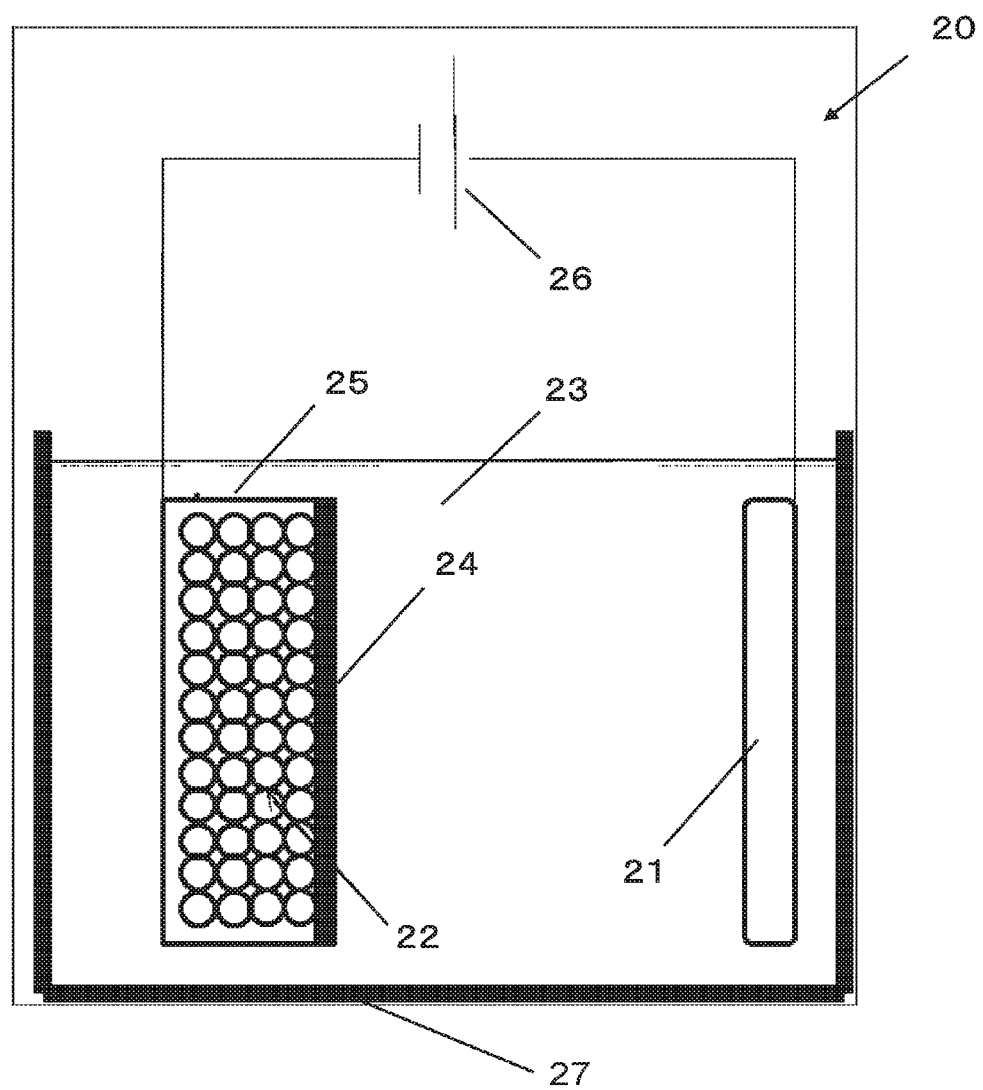
FIG. 4 is an inner-bulk reforming apparatus used for producing the negative electrode active material of the present invention.

The inner-bulk reforming can be conducted by using, for example, an inner-bulk reforming shown in FIG. 4, although the structure of the apparatus is not particularly limited.

The inner-bulk reforming apparatus 20 is provided with a bath 27 filled with organic solvent 23, a positive electrode (lithium source) 21 arranged in the bath 27 and connected to the one side of an electric source 26, a powder storage container 25 arranged in the bath 27 and connected to the other side of an electric source 26, and a separator 24 provided between the positive electrode 21 and the powder storage container 25.

It is desirable that the reformed active material is subsequently dried in an oxygen atmosphere, a carbonic acid atmosphere, a fluorine atmosphere, or a hydrogen atmosphere. This renders the bulk composition more favorable. Besides, it is desirable to set the temperature, although it is not particularly limited, to 800° C. or below, since disproportionation of the particle can be suppressed.

In the above inner-bulk reforming, it is desirable to form a fluorine compound by changing electric potential or temperature condition. This makes it possible to obtain denser film.

Especially, regarding lithium fluoride, it is desirable to be kept at 45° C. or more during Li insertion and Li elimination.

Besides, the obtained reforming particle does not necessarily contain a carbon layer. However, when more homogeneous control is required in the above inner-bulk reforming treatment, reduction of an electric potential distribution etc. is necessary, and therefore the existence of a carbon layer is desirable.

As organic solvent 23 in the bath 27, ethylene carbonate, propylene carbonate, dimethyl carbonate, diethyl carbonate, ethyl methyl carbonate, fluoromethyl methyl carbonate, difluoromethyl methyl carbonate, etc. may be used.

Moreover, lithium hexafluorophosphate ($LiPF_6$), lithium tetrafluoroborate ($LiBF_4$), etc. may be used as electrolyte salt contained in the organic solvent 23.

As the positive electrode 21, Li foil may be used, and a Li-containing compound, a Li-containing composite oxide also may be used. Further, it is possible to use lithium chloride, lithium carbonate, lithium oxide, etc. as a Li-containing compound; and is possible to use lithium cobalt oxide, olivine iron lithium, etc. as a main component of a Li-containing composite oxide.

Subsequently, the particle of negative electrode active material is mixed with other materials such as a negative electrode binder, a conductive assistant, etc. to make a negative electrode mixture, and then is made to slurry by adding organic solvent or water etc.

Then the above negative electrode mixture slurry is applied to the surface of negative electrode current collector 11 and dried to form the negative electrode active material layer 12. In this case, heating press may be conducted according to a necessity.

According to the negative electrode described above, the stability of an active material accompanying with an improvement of initial battery efficiency and cycle characteristics is improved by converting $SiO_2$ component in the bulk of a particle of negative electrode active material to a stable Li compound.

Especially, it is necessary that the negative electrode active material has two or more peaks in a region of a bond energy ranging from 520 eV to 537 eV in an O 1s peak shape given in an X-ray photoelectron spectroscopy. In this case, higher effect can be obtained when Li silicate, lithium carbonate, and lithium oxide is formed in the bulk or on its surface layer.

Moreover, it is possible that the state of compound in the bulk is more homogenized by coating the particle of negative electrode active material with a carbon material. And by the existence of fluoride on the surface layer of the particle of negative electrode active material, the stability as an active material is improved, thereby higher effect can be obtained.

Further, it is possible to obtain an effect of suppressing a deformation of the electrode containing current collector when the negative electrode current collector 11 contains carbon and sulfur in an amount of 90 ppm or less.

<A Lithium Ion Secondary Battery>

Next, a lithium ion secondary battery using the above negative electrode for a lithium ion secondary battery will be explained with referring to FIG. 3.

[The Constitution of Laminate Film Type Secondary Battery]

Figure 3:
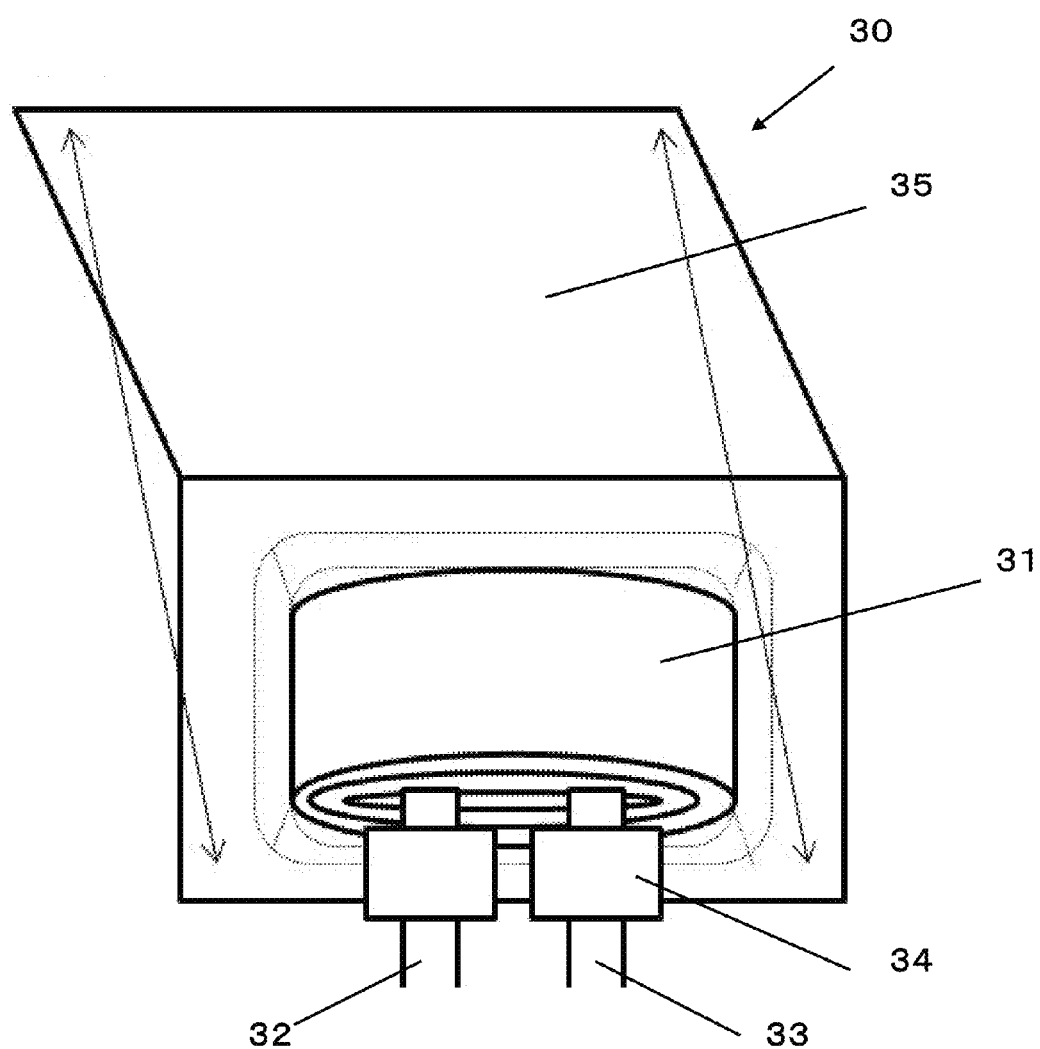
FIG. 3 is a figure showing an example of the constitution of the lithium ion secondary battery (laminate film type) of the present invention.

In a laminate film type secondary battery 30 shown in FIG. 3 mainly stores a wound electrode body 31 in a seat-shaped outer packaging 35. This wound body is provided with a separator between a positive electrode and a negative electrode and are wound. In addition, there exists an instance in which the outer packaging stores a laminate body having a separator between a positive electrode and a negative electrode.

In either electrode body, a positive electrode lead 32 is attached to the positive electrode, and a negative electrode lead 33 is attached to the negative electrode. The periphery of the electrode body is protected by a protection tape.

The positive and negative leads are led out toward one direction from the inside to the outside of the outer packaging 35, for example. The positive electrode lead 32 is formed by conductive material such as aluminum, and the negative electrode lead 33 is formed by conductive material such as nickel, copper.

The outer packaging 35 is, for example, a laminate film in which a fused layer, a metal layer, and a surface protection layer are laminated in this order. These laminate films are adhered each other on the peripheral edges on the fused layers of the two films by fusion, adhesive, etc. such that the fused layers are faced to the electrode body 31.

The fused layer is a film such as polyethylene or polypropylene, and the metal layer is aluminum foil and so on. The protection layer is nylon, for example.

In order to prevent a permeation of the open air, an adhesion film 34 is inserted between the outer packaging 35 and the positive and negative leads. Illustrative examples of this material include polyethylene, polypropylene and polyolefin resin.

[The Positive Electrode]

The positive electrode is provided with positive electrode active material layers on both sides or on one side of a positive electrode current collector, for example, similar to a negative electrode 10 in FIG. 1.

The positive electrode current collector is formed by conductive material such as aluminum.

The positive electrode active material layer contains any one or more of positive electrode material which can absorb and emit lithium ions, and may contain other materials such as a binder, a conductive assistant agent, and a dispersing agent according to the design. In this case, the details of a binder and a conductive assistant agent may be the same as, for example, a negative electrode binder and a negative electrode conductive assistant agent already described.

As the positive electrode material, a lithium-containing compound is desirable. Illustrative examples of this lithium-containing compound includes composite oxides consist of lithium and a transition metal element or phosphate compounds containing lithium and a transition metal element. Among these positive electrode materials, compounds containing one or more of nickel, iron, manganese, cobalt are preferred.

These positive electrode materials are represented by chemical formulae such as $Li_xM1O_2$ or $Li_yM2PO_4$. In the above chemical formulae, M1 and M2 represent at least one transition metal element; the values "x" and "y" are generally represented by $0.05 \leq x \leq 1.10$, $0.05 \leq y \leq 1.10$, although they represent different values depending on a charge/discharge state of a battery.

As the composite oxides containing lithium and a transition metal element, for example, composite oxide of lithium and cobalt ($Li_xCoO_2$), composite oxide of lithium and nickel ($Li_xNiO_2$), etc. are illustrated. As the phosphate compounds containing lithium and a transition metal element, for example, lithium iron phosphate compound ($LiFePO_4$), lithium iron manganese phosphate compound ($LiFe_{1-u}Mn_uPO_4 (0<u<1)$) are illustrated. By using positive electrode material described above, a high battery capacity together with excellent cycle characteristics can be obtained.

[The Negative Electrode]

The negative electrode has a constitution same as the above-described negative electrode 10 for a lithium ion secondary battery shown in FIG. 1 and has negative electrode active material layers on both sides of a current collector, for example. The negative electrode is preferred to have larger negative charge capacity compared to the electric capacity obtained from a positive electrode active material agent (a charge capacity as a battery). This makes it possible to suppress deposition of lithium metal on a negative electrode.

The positive electrode active material layer is provided on a part of both surfaces of a positive electrode current collector, and the negative electrode active material layers are provided on a part of both surfaces of a negative electrode current collector. In this case, the negative electrode active material layer provided on the negative electrode current collector, for example, has a region which does not corresponds to a positive electrode active material layer to be faced. This intends to perform stabilized battery design.

The above region where the negative electrode active material layer and the positive electrode active material layer do not face each other is hardly influenced by charge/discharge. Therefore the state of a negative electrode active material layer is kept intact as just after the formation, thereby the composition of the negative electrode active material and the like can be evaluated accurately with good reproducibility, since the composition and so on does not depend on the existence or nonexistence of charge/discharge.

[The Separator]

The separator is a one which separates a positive electrode and a negative electrode, and allows lithium ions to pass with preventing current short due to a contact of both electrodes. This separator is formed by a porous film consists of synthetic resin or ceramic, for example, and may contain a laminate structure in which two or more porous films are laminated. As the synthetic resin, polytetrafluoroethylene, polypropylene, polyethylene, etc. are illustrated, for example.

[The Electrolytic Solution]

A part of the active material layer or the separator is impregnated by liquid electrolyte (electrolytic solution). In this electrolytic solution, electrolyte salt is dissolved in solvent, and other materials such as additive agent may be contained.

As the solvent, for example, nonaqueous solvent may be used. As the nonaqueous solvent, for example, ethylene carbonate, propylene carbonate, butylene carbonate, dimethyl carbonate, diethyl carbonate, ethyl methyl carbonate, methyl propyl carbonate, 1,2-dimethoxyethane, tetrahydrofuran are illustrated. Among them, it is preferred to use one or more of ethylene carbonate, propylene carbonate, dimethyl carbonate, diethyl carbonate, ethyl methyl carbonate, since better property can be obtained.

Moreover, in this case, it is possible to improve dissociation of electrolyte salt and ionic mobility by combining high-viscosity solvent such as ethylene carbonate, propylene carbonate and low-viscosity solvent such as dimethyl carbonate, ethyl methyl carbonate, diethyl carbonate.

When alloy based negative electrode is used, it is especially desirable to contain at least one of halogenated chain carbonate ester or halogenated cyclic carbonate ester, as the solvent.

This makes it possible to form stable coat on the surface of the negative electrode active material during charge/discharge, especially during charge.

Here, the halogenated chain carbonate ester is chain carbonate ester having halogen as a constitutive element (that is, at least one hydrogen is substituted by halogen). And the halogenated cyclic carbonate ester is cyclic carbonate ester having halogen as a constitutive element (that is, at least one hydrogen is substituted by halogen).

Although the kind of halogen is not particularly limited, fluorine is preferred, since better coat is formed compared to other halogens. As the number of halogen, the larger is better. Since this makes it possible to obtain more stable coat and to lower decomposition reaction of the electrolytic solution.

As the halogenated chain carbonate ester, for example, fluoromethyl methyl carbonate, difluoromethyl methyl carbonate, etc. are illustrated. As the halogenated cyclic carbonate ester, for example, 4-fluoro-1,3-dioxolane-2-one, 4,5-difluoro-1,3-dioxolane-2-one and the like are illustrated.

It is preferred to contain cyclic carbonate ester having unsaturated carbon-carbon bond as an additive agent to the solvent. Since this makes it possible to form a stable coat on the surface of a negative electrode during charge/discharge and to suppress decomposition reaction of electrolytic solution. As the cyclic carbonate ester having unsaturated carbon-carbon bond, for example, vinylene carbonate, vinyl ethylene carbonate are illustrated.

Moreover, it is preferred to contain sultone (cyclic sulfate ester) as an additive agent to the solvent, since chemical stability of a battery is improved. As the sultone, for example, propane sultone, propene sultone are illustrated.

Furthermore, the solvent preferably contains acid anhydride, since chemical stability of the electrolytic solution is improved. As the acid anhydride, for example, propane disulfonic anhydride is illustrated.

The electrolyte salt can contain any one or more of light metal salt such as lithium salt. As the lithium salt, for example, lithium hexafluorophosphate ($LiPF_6$), lithium tetrafluoroborate ($LiBF_4$) are illustrated.

The content of the electrolyte salt is preferably 0.5 mol/kg or more and 2.5 mol/kg or less to the solvent, since high ion conductivity can be obtained.

[The Method for Producing a Laminate Film Type Lithium Ion Secondary Battery]

In the beginning, a positive electrode is prepared by using the positive electrode material described above.

First, the positive electrode active material is mixed with a binder, conductive assistant agent, etc. according to a necessity to make a positive electrode mixture, and subsequently dispersed in organic solvent to make positive electrode mixture slurry.

Subsequently, the mixture slurry is applied to a positive electrode current collector by a coating apparatus such as a die coater having a knife roll or a die head, and then a positive electrode active material layer is obtained by hot-air drying.

Lastly, the positive electrode active material layer is compression molded by a roll-press machine and the like. In this case, heating or plural times of repetition may be applied.

Here, the positive electrode active material layers are formed on both side of the positive electrode current collector. At this time, the coating length of the active material on one side of the positive electrode current collector may be different from that of the active material on the other side of the positive electrode current collector.

Next, a negative electrode active material layer is formed on a negative electrode current collector to prepare a negative electrode by using the same operation procedure as in the negative electrode 10 for a lithium ion secondary battery described above.

When preparing a positive electrode and a negative electrode, each active material layers are formed on each side of the positive and negative electrodes. In this case, the coating length of the active material on one side of the current collector may be different from that of the active material on the other side of the current collector in either electrode (see FIG. 1)

Subsequently, an electrolytic solution is prepared. Then the positive electrode lead 32 is attached to the positive electrode current collector and the negative electrode lead 33 is attached to the negative electrode current collector by ultrasonic welding and the like.

Then, the positive electrode and the negative electrode are laminated or wound via a separator to prepare the wound electrode body 31, and onto its periphery, protection tape is adhered. Subsequently, the wound body is formed so as to be flat shape.

Further, the wound electrode body is put between the film-shaped folded outer packaging, and then the insulation parts of the outer packaging 35 are adhered each other by hot melt method, thereby the wound electrode body is encapsulated with one direction is emitted. An adhesion film is inserted between the positive electrode lead and the outer packaging and between the negative electrode lead and the outer packaging.

The electrolytic prepared as above is introduced through the released part in a certain amount, thereby vacuum impregnation is conducted. After the impregnation, the released part is adhered by vacuum hot melt method.

A laminate film type secondary battery 30 can be prepared as described above.

EXAMPLES

Hereinafter, with reference to examples and comparative examples, the present invention will be more detailed. However, the present invention is not limited thereto.

Comparative Example 1-1 to Comparative Example 1-6

Laminate film type secondary batteries 30 shown in FIG. 3 were prepared by means of the following procedure.

First, a positive electrode was prepared. As a positive electrode active material, 95% by mass of $LiCoO_2$ of a lithium cobalt composite oxide, 2.5% by mass of a positive electrode conductive assistant agent, and 2.5% by mass of a positive electrode binder (polyvinylidene fluoride: PVDF) were mixed to form a positive electrode mixture. Subsequently, the positive electrode mixture was dispersed in organic solvent (N-methyl-2-pyrrolidone: NMP) to form paste-state slurry. Then, the slurry was applied onto both side of the positive electrode current collector by a coating apparatus having a die head, and subsequently dried by a hot-air drying apparatus. In this case, a positive electrode current collector with a thickness of 15 μm was used. Lastly, compression molding was conducted by a roll-press.

Then, a negative electrode was prepared. As a negative electrode active material, a mixed raw material of metal silicon and silicon dioxide were introduced into a reaction furnace and vaporized in an atmosphere of a vacuum of 10 Pa, and then deposited onto an absorbing plate. After this was sufficiently cooled, the deposit was taken out and ground by a ball mill.

After the adjustment of the particle size, carbon layer coating was conducted by thermal decomposition CVD according to a necessity.

The prepared powder was subjected to inner-bulk reforming in a mixed solvent of propylene carbonate and ethylene carbonate (1:1, containing 1.3 mol/Kg of electrolyte salt) using an electrochemical method by using an inner-bulk reforming apparatus 20.

The obtained material was subjected to drying treatment under a carbonate atmosphere according to a necessity.

Subsequently, the particle of negative electrode active material and a precursor of a negative electrode binder, a conductive assistant agent 1 and a conductive assistant agent 2 were mixed in a dried-weight ratio of 80:8:10:2, and then diluted by NMP to form paste-state negative electrode mixture slurry. In this case, NMP was used as solvent for polyamic acid.

Then the negative electrode mixture slurry was applied to both sides of a negative electrode current collector by a coating apparatus, followed by drying. As this negative electrode current collector, electrolytic copper foil (thickness=15 μm) was used.

Lastly, it was fired at 400° C. for 1 hour in a vacuum atmosphere and thereby a negative electrode binder (polyimide) was formed.

Subsequently, solvents (ethylene carbonate (EC) and dimethyl carbonate (DMC)) are mixed, and then electrolyte salt (lithium hexafluorophosphate: $LiPF_6$) was dissolved to prepare electrolytic solution. In this case, the composition of the solvent was set to EC:DMC=30:70 in a volume ratio, and the content of the electrolyte salt was set to 1.2 mol/kg for the solvent.

Then a secondary battery was assembled as follows.

First, aluminum lead was welded to one end of the positive electrode current collector by ultrasonic, and nickel lead was welded to one end of the negative electrode current collector.

Subsequently, the positive electrode, a separator, the negative electrode, and a separator were laminated in this order, and wound in a longitudinal direction to obtain a wound electrode body. The end of the winding was fixed with PET protection tape. As the separator, a laminated film (thickness of 12 μm) in which a porous polypropylene-base film was put between porous polyethylene-base films was used.

Then, the electrode body was put between outer packaging, and then peripheries excluding one side are hot melted each other, and thereby the electrode body was stored in the outer packaging. As the outer packaging, an aluminum laminated film in which a nylon film, aluminum foil, and a polypropylene film are laminated.

Subsequently, the prepared electrolyte was introduced through the openings and was impregnated under vacuum atmosphere, and then was hot melted and was encapsulated.

In Comparative Example 1-1 to Comparative Example 1-6, each "x" in $SiO_x$ was fixed to 0.9, each of the ratio of the peak intensity A in a low-energy region and the peak intensity B in a high-energy region: A/B was fixed to 1, and the conditions of Li-insertion and Li-elimination were varied in an electrochemical method to control the products to be generated, thereby the products to be generated in the bulk were varied. Incidentally, in each Comparative Example 1-1 to Comparative Example 1-6, there was 1 or less peak in a region of a bond energy ranging from 520 eV to 537 eV in an O 1s peak shape given in an X-ray photoelectron spectroscopy. The generated product in Comparative Example 1-2, Comparative Example 1-3, Comparative Example 1-4, Comparative Example 1-5, and Comparative Example 1-6, were $SiO_2$, $Li_4SiO_4$, $Li_2SiO_3$, $Li_2CO_3$, and $Li_2O$ respectively; and the generated product could not be identified in Comparative Example 1-1, since any peak did not appeared in an O 1s peak shape given in an X-ray photoelectron spectroscopy.

Besides, the median diameter of the particle of negative electrode active material was 4 μm, the full width at half maximum (2θ) of a diffraction peak attributable to (111) crystal face obtained by an X-ray diffraction of the negative electrode active material was 1.22°, a size of the crystallite corresponding to Si (111) was 7.21 nm.

The cycle characteristics and the initial charge/discharge characteristics of the secondary batteries were evaluated on Comparative Example 1-1 to Comparative Example 1-6.

The cycle characteristics were evaluated as follows.

First, charge/discharge was conducted for two cycles at an atmosphere of 25° C. in order to stabilize the battery, and the discharge capacity at the second cycle was measured.

Subsequently, charge/discharge was conducted until the total cycle attains to 100 cycles, and the discharge capacities were measured each time.

Lastly, the discharge capacity at 100th cycle was divided by the discharge capacity at second cycle to compute a capacity retention ratio.

Besides, as the cycle condition, constant current charge was conducted at a constant current density of 2.5 mA/cm$^2$ until the voltage reached 4.2 V, and after the voltage had reached 4.2 V, charge was conducted at a constant voltage of 4.2 V until a current density reached 0.25 mA/cm$^2$. In a discharge, constant current discharge was conducted at a constant current density of 2.5 mA/cm² until the voltage reached 2.5 V.

As initial charge/discharge characteristic, initial efficiency (%)=(an initial discharge capacity/an initial charge capacity)×100 was calculated.

Besides, the atmosphere and the temperature was set to the same as in the evaluation of the cycle characteristics, and the charge/discharge condition was set to 0.2 times that of the evaluation of the cycle characteristics. That is, the battery was charged at a constant current density of 0.5 mA/cm² until the voltage reached 4.2 V, and after the voltage had reached 4.2 V, the battery was charged at a constant voltage of 4.2 V until a current density reached 0.05 mA/cm². In a discharge, the battery was discharged at a constant current density of 0.5 mA/cm² until the voltage reached 2.5 V.

In Table 1, measured results of Comparative Example 1-1 to Comparative Example 1-6 are shown.

TABLE 1

| | 2 or more peaks in O 1s peak shape | generated product | capacity retention ratio [%] | initial efficiency [%] |
|---|---|---|---|---|
| Comparative Example 1-1 | none | — | 51 | 46 |
| Comparative Example 1-2 | none | $SiO_2$ | 60 | 52 |
| Comparative Example 1-3 | none | $Li_4SiO_4$ | 61 | 61 |
| Comparative Example 1-4 | none | $Li_2SiO_3$ | 62 | 62 |
| Comparative Example 1-5 | none | $Li_2CO_3$ | 61 | 62 |
| Comparative Example 1-6 | none | $Li_2O$ | 61 | 61 |

Example 1-1 to Example 1-11

Secondary batteries were prepared as in the same manner with Comparative Example 1-1 to Comparative Example 1-6, and the conditions of Li-insertion and Li-elimination were varied in an electrochemical method to control the product to be generated, thereby the product to be generated in the bulk was altered. In Example 1-1 to Example 1-11, there was 2 or more peaks in a region of a bond energy ranging from 520 eV to 537 eV in an O 1s peak shape given in an X-ray photoelectron spectroscopy, and there was a peak in the chemical shift region of from 15 to 50 ppm given in a ⁷Li-MAS-NMR spectrum at a state of constant current and constant voltage charge reached 0 V (the charge is finished in 70 hours) in at least a single point during a constant current and constant voltage charge reached 0 V and a constant current discharge reached 1.5 V are repeated for 50 cycles. The products generated in Example 1-1 to Example 1-11 are shown in Table 2.

In Example 1-1 to Example 1-11, the cycle characteristics and initial charge/discharge characteristics of the secondary batteries were evaluated as in the same manner with Comparative Example 1-1 to Comparative Example 1-6.

In Table 2, measured results of Example 1-1 to Example 1-11 are shown.

TABLE 2

| | generated product | crystallinity of $Li_2SiO_3$ | crystallinity of $Li_4SiO_4$ | capacity retention ratio [%] | initial efficiency [%] |
|---|---|---|---|---|---|
| Example 1-1 | $SiO_2$, $Li_4SiO_4$ | — | amorphous | 73 | 75 |
| Example 1-2 | $SiO_2$, $Li_2SiO_3$ | amorphous | — | 74 | 76 |
| Example 1-3 | $SiO_2$, $Li_4SiO_4$, $Li_2O$ | — | amorphous | 74 | 75 |
| Example 1-4 | $SiO_2$, $Li_4SiO_4$, $Li_2CO_3$ | — | amorphous | 81 | 80 |
| Example 1-5 | $Li_2SiO_3$, $Li_4SiO_4$, $Li_2O$ | amorphous | amorphous | 81 | 81 |
| Example 1-6 | $Li_2SiO_3$, $Li_4SiO_4$, $Li_2CO_3$ | amorphous | amorphous | 82 | 81 |
| Example 1-7 | $Li_2SiO_3$, $Li_4SiO_4$, $Li_2CO_3$, $Li_2O$ | amorphous | amorphous | 82 | 81 |
| Example 1-8 | $Li_2SiO_3$, $SiO_2$, $Li_4SiO_4$, $Li_2O$ | amorphous | amorphous | 82 | 81 |
| Example 1-9 | $SiO_2$, $Li_2SiO_3$, $Li_4SiO_4$, $Li_2CO_3$, $Li_2O$ | amorphous | amorphous | 81 | 80.5 |
| Example 1-10 | $Li_2Si_2O_5$, $Li_4SiO_4$, $Li_2O$ | — | amorphous | 82 | 81 |
| Example 1-11 | $Li_2Si_2O_3$, $Li_4SiO_4$, $Li_2O$ | — | amorphous | 82 | 81 |

As can be seen from Table 1 and Table 2, Examples 1-1 to Example 1-11, in which the number of the peaks in a region ranging from 520 eV to 537 eV in an O 1s peak shape given in an X-ray photoelectron spectroscopy are 2 or more, showed improved capacity retention ratios and initial efficiencies compared to Comparative Example 1-1 to Comparative Example 1-6, in which the number of the peak are 1 or less. The generated products are roughly classified to silicon oxides, oxidized lithium compounds, and lithium silicates. Especially, the capacity retention ratio and initial efficiency were improved when oxidized lithium compounds or lithium silicates were generated.

Incidentally, the condition for producing the product can be controlled by controlling the atmosphere, a ratio of the raw materials, or an additive in producing the silicon-based material to control the balance in the bulk, and can be controlled by an additive of the electrolyte or especially by an electric potential regulation in the subsequent electrochemical method.

Example 2-1 to Example 2-4

Secondary batteries were prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$ (that is, the number of the peaks in a region of a bond energy ranging from 520 eV to 537 eV in an O 1s peak shape was 2 or more). The generated $Li_2SiO_3$ and $Li_4SiO_4$ were amorphous. Furthermore, each "x" of the $SiO_x$ was varied by adjusting the oxygen content in the bulk. In this case, the oxygen contents of the deposits were varied by changing a ratio of the starting material to be vaporized or a vaporizing temperature.

Each "x" of the $SiO_x$ in Example 2-1, Example 2-2, Example 2-3, and Example 2-4 was 0.5, 0.7, 1.2, and 1.6 respectively.

In Example 2-1 to Example 2-4, the cycle characteristics and initial charge/discharge characteristics of the secondary batteries were evaluated as in the same manner with Comparative Example 1-1 to Comparative Example 1-6.

Comparative Example 2-1 to Comparative Example 2-2

Secondary batteries were prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$ (that is, the number of the peaks in a region of a bond energy ranging from 520 eV to 537 eV in an O 1s peak shape given in an X-ray photoelectron spectroscopy was 2 or more). Furthermore, each "x" of the $SiO_x$ was varied by changing an oxygen content in the bulk. In this case, the oxygen contents of the deposits were varied by changing a ratio of the starting material to be vaporized or a vaporizing temperature.

Each "x" of the $SiO_x$ in Comparative Example 2-1 and Comparative Example 2-2 was 0.3 and 1.8 respectively.

In Comparative Example 2-1 to Comparative Example 2-2, the cycle characteristics and initial charge/discharge characteristics of the secondary batteries were evaluated as in the same manner with Comparative Example 1-1 to Comparative Example 1-6.

In Table 3, measured results of Comparative Example 2-1 to Comparative Example 2-2 and Example 2-1 to Example 2-4 are shown.

Example 1-8, in which the "x" of the $SiO_x$ was 0.9, is also shown in Table 3.

TABLE 3

| | "x" of $SiO_x$ | capacity retention ratio [%] | initial efficiency [%] |
|---|---|---|---|
| Comparative Example 2-1 | 0.3 | 61 | 80 |
| Example 2-1 | 0.5 | 76 | 79 |
| Example 2-2 | 0.7 | 78 | 80 |
| Example 1-8 | 0.9 | 82 | 81 |
| Example 2-3 | 1.2 | 83 | 80 |
| Example 2-4 | 1.6 | 81 | 80 |
| Comparative Example 2-2 | 1.8 | 69 | 79 |

As can be seen from Table 3, when the oxygen content is insufficient (x=0.3), the capacity retention ratio was considerably deteriorated, although the initial efficiency was improved. On the other hand, when the oxygen content is high (x=1.8), the conductivity was lowered and the capacity retention ratio was deteriorated.

Comparative Example 3-1 to Comparative Example 3-4

Secondary batteries were prepared as in the same manner with Example 1-1 to Example 1-11. However, there appeared a peak in the chemical shift region of from 15 to 50 ppm given in a $^7$Li-MAS-NMR spectrum at a state of constant current and constant voltage charge reached 0 V (the charge is finished in 70 hours) in at least a single point during a constant current and constant voltage charge reached 0 V and a constant current discharge reached 1.5 V are repeated for 50 cycles. Furthermore, the conditions of Li-insertion and Li-elimination were varied in an electrochemical method to control the products to be generated, thereby the products to be generated in the bulk were varied and each "x" of the $SiO_x$ was varied. In Comparative Example 3-1 to Comparative Example 3-4, the number of the peak in a region of a bond energy ranging from 520 eV to 537 eV in an O 1s peak shape given in an X-ray photoelectron spectroscopy was 1. Each generated product of Comparative Example 3-1 and Comparative Example 3-3 was $Li_4SiO_4$, and each generated product of Comparative Example 3-2 and Comparative Example 3-4 was $Li_2O$. Furthermore, each "x" of Comparative Example 3-1 and Comparative Example 3-2 was set to 0.7, and each "x" of Comparative Example 3-3 and Comparative Example 3-4 was set to 1.2.

In Comparative Example 3-1 to Comparative Example 3-4, the cycle characteristics and initial charge/discharge characteristics of the secondary batteries were evaluated as in the same manner with Comparative Example 1-1 to Comparative Example 1-6.

In Table 4, measured results of Comparative Example 3-1 to Comparative Example 3-4 are shown.

TABLE 4

| | generated product | "x" of $SiO_x$ | capacity retention ratio [%] | initial efficiency [%] |
|---|---|---|---|---|
| Comparative Example 3-1 | $Li_4SiO_4$ | 0.7 | 60 | 61 |
| Comparative Example 3-2 | $Li_2O$ | 0.7 | 61 | 60 |
| Comparative Example 3-3 | $Li_4SiO_4$ | 1.2 | 61 | 60 |
| Comparative Example 3-4 | $Li_2O$ | 1.2 | 60 | 61 |

As can be seen from Table 1 and Table 4, when the bulk contained single product (that is, the number of the peak in an O 1s peak shape is one), the capacity retention ratio and initial efficiency were not improved even when the oxygen content was adjusted.

Example 3-1

Secondary battery was prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$. The generated $Li_2SiO_3$ and $Li_4SiO_4$ were amorphous. There was not a peak in the chemical shift region of from 15 to 50 ppm given in a $^7$Li-MAS-NMR spectrum at a state of constant current and constant voltage charge reached 0 V (the charge is finished in 70 hours) in at least a single point during a constant current and constant voltage charge reached 0 V and a constant current discharge reached 1.5 V are repeated for 50 cycle.

In Example 3-1, the cycle characteristics and initial charge/discharge characteristics of the secondary battery were evaluated as in the same manner with Comparative Example 1-1 to Comparative Example 1-5.

In Table 5, measured results of Example 3-1 are shown. Example 1-8, in which there was a peak in the chemical shift region of from 15 to 50 ppm given in a $^7$Li-MAS-NMR spectrum, is also shown in Table 5.

TABLE 5

| | peak in the chemical shift in a $^7$Li-MAS-NMR spectrum | capacity retention ratio [%] | initial efficiency [%] |
|---|---|---|---|
| Example 1-8 | exist | 82 | 81 |
| Example 3-1 | none | 76 | 81 |

As shown in Table 5, the capacity retention ratio was improved when there was a peak in the chemical shift region of from 15 to 50 ppm given in a $^7$Li-MAS-NMR spectrum compared to the case in which there was not the peak.

When having the peak in the chemical shift region of from 15 to 50 ppm given in a $^7$Li-MAS-NMR spectrum, the stabilization had been realized during the repeat of the charge and discharge in at least an initial stage of the cycle.

The peak in the chemical shift given in an NMR is considered to be attributable to Li silicate in view of an O 1s peak shape and Si 2p peak shape given in an X-ray photoelectron spectroscopy. However, it is suggested that the atomic state in at least the secondary or more highly neighboring position is different from ordinal Li silicate, which has a peak in the vicinity of 0 ppm.

Example 4-1 to Example 4-8

Secondary batteries were prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$. The generated $Li_2SiO_3$ and $Li_4SiO_4$ were amorphous. Furthermore, each ratio of a peak intensity A in a region of low bond energy and a peak intensity B in a region of high bond energy in a Si 2p peak shape given in an X-ray photoelectron spectroscopy: A/B was varied.

In Example 4-1, Example 4-2, Example 4-3, Example 4-4, Example 4-5, Example 4-6, Example 4-7, and Example 4-8, the ratios of the peak intensity A/B were 0.2, 0.3, 0.5, 0.75, 1.5, 2, 3, and 4 respectively.

In Example 4-1 to Example 4-8, the cycle characteristics and initial charge/discharge characteristics of the secondary batteries were evaluated as in the same manner with Example 1-1 to Example 1-5.

In Table 6, measured results of Example 4-1 to Example 4-8 are shown.

Example 1-8, in which the ratio of the peak intensity A/B was 1, is also shown in Table 6.

TABLE 6

| | A/B | capacity retention ratio [%] | initial efficiency [%] |
|---|---|---|---|
| Example 4-1 | 0.2 | 74 | 73 |
| Example 4-2 | 0.3 | 80 | 77 |
| Example 4-3 | 0.5 | 81 | 80 |
| Example 4-4 | 0.75 | 82 | 82 |
| Example 1-8 | 1 | 82 | 81 |
| Example 4-5 | 1.5 | 81 | 80 |
| Example 4-6 | 2 | 80 | 80 |
| Example 4-7 | 3 | 80 | 78 |
| Example 4-8 | 4 | 76 | 72 |

As can be seen from Table 6, when the ratio of the peak intensity A/B is 0.3 or more and 3 or less, more excellent capacity retention ratio and initial efficiency can be obtained, and when the ratio of the peak intensity A/B is 0.5 or more and 2 or less, further excellent initial efficiency can be obtained.

Example 5-1 to Example 5-12

Secondary batteries were prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$.

Moreover, the state of the generated contents was varied by controlling the electric potential, electric current, and inserting and eliminating method for Li in producing the Li compound; and after the generation, the state of the contents were varied by adjusting the gas atmosphere and thermal drying; thereby the crystallinities of the products were varied.

In Example 5-1 to Example 5-12, the crystallinities of $Li_2SiO_3$ and $Li_4SiO_4$ were varied.

In Example 5-1 to Example 5-12, the cycle characteristics and initial charge/discharge characteristics of the secondary batteries were evaluated as in the same manner with Comparative Example 1-1 to Comparative Example 1-6.

In Table 7, measured results of Example 5-1 to Example 5-12 are shown.

Example 1-8, in which both of the $Li_2SiO_3$ and $Li_4SiO_4$ were amorphous, is also shown in Table 7.

TABLE 7

| | full width at half maximum of $Li_2SiO_3$ [°] | full width at half maximum of $Li_4SiO_4$ [°] | capacity retention ratio [%] | initial efficiency [%] |
|---|---|---|---|---|
| Example 1-8 | amorphous | amorphous | 82 | 81 |
| Example 5-1 | 0.4 | amorphous | 72 | 75 |
| Example 5-2 | 0.75 | amorphous | 76 | 80 |
| Example 5-3 | 5 | amorphous | 78 | 81 |
| Example 5-4 | 10 | amorphous | 80 | 81 |
| Example 5-5 | amorphous | 0.1 | 73 | 76 |
| Example 5-6 | amorphous | 0.2 | 76 | 80 |
| Example 5-7 | amorphous | 0.5 | 77 | 81 |
| Example 5-8 | amorphous | 3 | 79 | 81 |
| Example 5-9 | amorphous | 10 | 80 | 81 |
| Example 5-10 | 0.4 | 0.1 | 71 | 71 |
| Example 5-11 | 0.75 | 0.5 | 75 | 78 |
| Example 5-12 | 5 | 1 | 79 | 80 |

As can be seen from Table 7, when the full width at half maximum (2θ) of a diffraction peak near 38.2680° in an X-ray diffraction due to $Li_2SiO_3$ is 0.75° or more, more excellent capacity retention ratio and initial efficiency can be obtained, and when the full width at half maximum (2θ) of a diffraction peak near 23.9661° in an X-ray diffraction due to $Li_4SiO_4$ is 0.2° or more, more excellent capacity retention ratio and initial efficiency could be obtained.

Furthermore, as can be seen from Table 7, it is desirable that the generated Li compound is substantially amorphous. Since higher crystallinity of a generated Li compound increases the resistivity of the active material.

Example 6-1 to Example 6-9

Secondary batteries were prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$. The generated $Li_2SiO_3$ and $Li_4SiO_4$ were amorphous. Moreover, the crystallinities of the active materials were varied.

In Example 6-1, Example 6-2, Example 6-3, Example 6-4, Example 6-5, Example 6-6, Example 6-7, Example 6-8, and Example 6-9, the full width at half maximum (2θ) of a diffraction peak attributable to Si(111) crystal face given in an X-ray diffraction, which represents crystallinity, were 0.756°, 0.796°, 1.025°, 1.271°, 1.845°, 2.257°, 2.593°, 10.123°, and 20.221° respectively; and the sizes of the crystallite corresponding to the Si(111) crystal face were 11.42 nm, 10.84 nm, 8.55 nm, 6.63 nm, 4.62 nm, 3.77 nm, 3.29 nm, 1.524 nm, and 0 nm respectively.

In addition, in Example 6-9, the full width at half maximum was calculated as 20° or more, but this is a result fitted by an analytical software, and a peak was not obtained substantially. Therefore, in Example 6-9, it was substantially amorphous.

In Example 6-1 to Example 6-9, the cycle characteristics and initial charge/discharge characteristics of the secondary batteries were evaluated as in the same manner with Comparative Example 1-1 to Comparative Example 1-6.

In Table 8, measured results of Example 6-1 to Example 6-9 are shown.

Example 1-8, in which the full width at half maximum (2θ) was 1.22 and the size of the crystallite corresponding to the Si(111) crystal face was 7.21 nm, is also shown in Table 8.

TABLE 8

| | full width at half maximum 2θ [°] | Si(111) crystallite [nm] | capacity retention ratio [%] | initial efficiency [%] |
|---|---|---|---|---|
| Example 6-1 | 0.756 | 11.42 | 74 | 81 |
| Example 6-2 | 0.796 | 10.84 | 76 | 81 |
| Example 6-3 | 1.025 | 8.55 | 77 | 81 |
| Example 1-8 | 1.22 | 7.21 | 82 | 81 |
| Example 6-4 | 1.271 | 6.63 | 83 | 81 |
| Example 6-5 | 1.845 | 4.62 | 84 | 81 |
| Example 6-6 | 2.257 | 3.77 | 84.5 | 81 |
| Example 6-7 | 2.593 | 3.29 | 84.6 | 81 |
| Example 6-8 | 10.123 | 1.524 | 86 | 81 |
| Example 6-9 | 20.221 (amorphous) | 0 | 86.5 | 81 |

As can be seen from Table 8, when the crystallinities of the active materials were varied, the capacity retention ratios were varied according to their crystallinities, and higher capacity retention ratio can be obtained especially in a material with low crystallinity in which the full width at half maximum (2θ) is 1.2° or more or the size of the crystallite corresponding to the crystal face Si(111) was 7.5 nm or less. Especially, highest capacity retention ratio could be obtained in an amorphous region.

Example 7-1 to Example 7-3

Secondary batteries were prepared as in the same manner with Example 1-1 to Example 1-11, except that the $Li_2SiO_3$, $SiO_2$, $Li_4SiO_4$, or $Li_2O$ were generated by an inner-bulk reforming. The generated $Li_2SiO_3$ and $Li_4SiO_4$ were amorphous. Moreover, as an inner-bulk reforming method, various methods were used.

In Example 7-1, Example 7-2, and Example 7-3, the inner-bulk reforming methods were a method of electric potential and electric current control+Li-insertion, a method of repeating potential and current control+Li-insertion/subsequent partial elimination for three times, and a thermal dope method respectively.

The method of electric potential and electric current control+Li-insertion is a method to insert Li into a bulk by controlling electric potential and electric current supplied to Li source 21 using an inner-bulk reforming apparatus 20 shown in FIG. 4.

The method of electric potential and electric current control+Li-insertion/subsequent partial elimination is a method to insert Li into a bulk by controlling electric potential and electric current supplied to Li source 21, and then to eliminate a part of the inserted Li by controlling electric potential and electric current using an inner-bulk reforming apparatus 20 shown in FIG. 4.

The thermal dope method is a method to conduct a thermal treatment after mixing a silicon material and a Li metal or a Li compound.

In Example 7-1 to Example 7-3, the cycle characteristics and initial charge/discharge characteristics of the secondary batteries were evaluated as in the same manner with Comparative Example 1-1 to Comparative Example 1-6.

In Table 9, measured results of Example 7-1 to Example 7-3 are shown.

Example 1-8, in which the reforming method was a method of electric potential and electric current control+Li-insertion/subsequent partial elimination, is also shown in Table 9.

TABLE 9

| | reforming method | capacity retention ratio [%] | initial efficiency [%] |
|---|---|---|---|
| Example 1-8 | electric potential and electric current control + Li-insertion/ subsequent partial elimination | 82 | 81 |
| Example 7-1 | electric potential and electric current control + Li-insertion | 81 | 79 |
| Example 7-2 | (electric potential and electric current control + Li-insertion/ subsequent partial elimination) × 3 times | 82 | 83 |
| Example 7-3 | thermal dope method | 71 | 78 |

As can be seen from Table 9, a method of electric potential and electric current control+Li-insertion/subsequent partial elimination is desirable as an inner-bulk reforming method. It is more desirable to conduct the insertion and elimination for plural times.

On the other hand, it was found that the thermal dope method was not a method which can reform an active material to be more favorable.

Example 8-1 to Example 8-7

Secondary batteries were prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$. The generated $Li_2SiO_3$ and $Li_4SiO_4$ were amorphous.

Further, as the reforming source (Li source), various material were used.

In Example 8-1, Example 8-2, Example 8-3, Example 8-4, Example 8-5, Example 8-6, and Example 8-7, lithium metal, lithium chloride, lithium carbonate, lithium oxide, olivine iron lithium, Ni containing lithium composite oxide, Mn containing lithium composite oxide were used respectively as a reforming source.

The cycle characteristics and the initial charge/discharge characteristics of the secondary batteries were evaluated on Example 8-1 to Example 8-7 in a manner the same as that of Comparative Example 1-1 to Comparative Example 1-6.

In Table 10, measured results of Example 8-1 to Example 8-7 are shown.

Example 1-8, in which lithium cobalt oxide was used as a reforming source, is also shown in Table 10.

TABLE 10

| | reforming source (Li source) | capacity retention ratio [%] | initial efficiency [%] |
|---|---|---|---|
| Example 1-8 | lithium cobalt oxide | 82 | 81 |
| Example 8-1 | Li metal | 82 | 81 |
| Example 8-2 | lithium chloride | 81 | 81 |
| Example 8-3 | lithium carbonate | 80.5 | 81 |
| Example 8-4 | lithium oxide | 80.5 | 81 |
| Example 8-5 | olivine iron lithium | 82 | 81 |
| Example 8-6 | Ni containing Li composite oxide | 82 | 81 |
| Example 8-7 | Mn containing Li composite oxide | 82 | 81 |

As can be seen from Table 10, an excellent capacity retention ratio and excellent initial efficiency are obtained in any reforming source described in the table.

Therefore, it is not necessary to limit a reforming source, but more stable material is desirable when considering a producing process.

Lithium composite oxide is more desirable than lithium metal, for example, lithium cobalt oxide and olivine iron lithium are desirable.

Among them, olivine iron lithium is particularly desirable since lower cost is attainable industrially due to its low charge electric potential and an output characteristic is excellent.

Lithium composite oxide also has an advantage to be able to recycle by mixing with a lithium-containing composite material and subjecting to thermal treatment after it was repeated an insertion-elimination of lithium in a certain times or more.

In addition, lithium composite oxide is substantially similar to positive electrode material which is considerably deteriorated compared to a battery grade. However, it is allowed to use as a reforming source even when the battery characteristic is low.

Example 9-1 to Example 9-2

Secondary batteries were prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$. The generated $Li_2SiO_3$ and $Li_4SiO_4$ were amorphous. Further, full width at half maximum (2θ), as a crystallinity, of a negative electrode active material was 20.221 (amorphous).

Furthermore, in Example 9-1, an inner-bulk reforming was conducted in a state in which SiO film was directly formed on a copper foil by vapor deposition as a reforming form. In Example 9-2, an inner-bulk reforming was conducted in a state in which SiO film was directly formed on a copper foil by thermal CVD (i.e., the method in which siloxane and argon gas were introduced to vacuum chamber and heated to 650° C. or more to be thermally decomposed and thereby deposited onto the substrate to form a film) as a reforming form.

The cycle characteristics and the initial charge/discharge characteristics of the secondary batteries were evaluated on Example 9-1 to Example 9-2 in a manner the same as that of Comparative Example 1-1 to Comparative Example 1-6.

In Table 11, measured results of Example 9-1 to Example 9-2 are shown.

Example 6-9, in which an inner-bulk reforming was conducted in a powdered state as the reforming form, is also shown in Table 11.

TABLE 11

| | reforming form | capacity retention ratio [%] | initial efficiency [%] |
|---|---|---|---|
| Example 6-9 | powdered state | 86.5 | 81 |
| Example 9-1 | vapor deposited SiO | 88 | 81 |
| Example 9-2 | CVD-SiO | 87 | 81 |

As can be seen from Table 11, a capacity retention ratio and an initial efficiency are improved by forming a SiO film onto a copper foil directly through a vapor deposition and conducting a reforming using an electrochemical method. An initial efficiency is improved by forming a SiO film onto a copper foil directly through a thermal decomposition CVD method and conducting a reforming using an electrochemical method.

Example 10-1 to Example 10-8

Secondary batteries were prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$. The generated $Li_2SiO_3$ and $Li_4SiO_4$ were amorphous.

Furthermore, as the negative electrode binder, various materials were used.

In Example 10-1, Example 10-2, Example 10-3, Example 10-4, Example 10-5, Example 10-6, Example 10-7, and Example 10-8, the negative electrode binder were polyamideimide, polyvinylidene fluoride, aramid, polyacrylic acid, lithium polyacrylate, carbonized polyimide, polyethylene, polymaleic acid respectively.

The cycle characteristics and the initial charge/discharge characteristics of the secondary batteries were evaluated on Example 10-1 to Example 10-8 in a manner the same as that of Comparative Example 1-1 to Comparative Example 1-6.

In Table 12, measured results of Example 10-1 to Example 10-8 are shown.

Example 1-8, in which a negative electrode binder was polyimide, is also shown in Table 12.

TABLE 12

| | negative electrode binder | capacity retention ratio [%] | initial efficiency [%] |
|---|---|---|---|
| Example 1-8 | polyimide | 82 | 81 |
| Example 10-1 | polyamideimide | 82 | 81 |
| Example 10-2 | polyvinylidene fluoride | 80 | 82 |
| Example 10-3 | aramid | 82 | 82 |
| Example 10-4 | polyacrylic acid | 82 | 83 |
| Example 10-5 | lithium polyacrylate | 81 | 83 |
| Example 10-6 | carbonized polyimide | 82 | 82 |
| Example 10-7 | polyethylene | 81 | 81 |
| Example 10-8 | polymaleic acid | 80 | 81 |

As can be seen from Table 12, an excellent capacity retention ratio and excellent initial efficiency are obtained by any negative electrode binder described in the table as a result of evaluation with materials described in the table as the negative electrode binder.

Example 11-1 to Example 11-3

Secondary batteries were prepared as in the same manner with Example 1-1 to Example 1-11, except that the inner-bulk reforming was conducted by Li insertion and elimination method of an electrochemical method to generate $Li_2SiO_3$, $SiO_2$, $Li_4SiO_4$, and $Li_2O$. The generated $Li_2SiO_3$ and $Li_4SiO_4$ were amorphous.

Furthermore, the compositions of negative electrode active materials were varied.

In Example 11-1, Example 11-2, and Example 11-3, each composition ratio of graphite (particle diameter:about 20 μm) and SiO was 90:10, 80:20, and 65:35 respectively.

The cycle characteristics and the initial charge/discharge characteristics of the secondary batteries were evaluated on Example 11-1 to Example 11-3 in a manner the same as that of Comparative Example 1-1 to Comparative Example 1-6.

In Table 13, measured results of Example 11-1 to Example 11-3 are shown.

Example 1-8, in which the composition ratio of graphite and SiO was 0:100, is also shown in Table 13.

TABLE 13

| | composition of negative electrode active material | capacity retention ratio [%] | initial efficiency [%] |
|---|---|---|---|
| Example 1-8 | SiO 100% | 82 | 81 |
| Example 11-1 | graphite 90% + SiO 10% | 91 | 89 |
| Example 11-2 | graphite 80% + SiO 20% | 90 | 87 |
| Example 11-3 | graphite 65% + SiO 35% | 88 | 86 |

As can be seen from Table 13, use of large amount of graphite improves both of the capacity retention ratio and initial efficiency. However, it lowers energy density, and therefore battery design comes to be important.

The present invention is not limited to the embodiments. The embodiments are only illustrative examples, and all that has a configuration substantially the same as that of a technical idea described in claims of the present invention and that exerts similar effect is included in a technical range of the present invention.

The invention claimed is:

1. A negative electrode active material for a negative electrode active material layer of a lithium ion secondary battery, wherein:
   the negative electrode active material comprises silicon-based material consisting of $SiO_x$ ($0.5 \leq x \leq 1.6$);
   the negative electrode active material has two or more peaks in a region of a bond energy ranging from 520 eV to 537 eV in an O 1s peak shape given in an X-ray photoelectron spectroscopy;
   two of the two or more peaks are peaks attributable to $Li_2SiO_3$ and $Li_2Si_2O_5$; and
   the negative electrode active material has a peak in the chemical shift region of from 15 to 50 ppm given in a $^7$Li-MAS-NMR spectrum at a state of constant current and constant voltage charge reached 0 V (the charge is finished in 70 hours) in at least a single point during a constant current and constant voltage charge reached 0 V and a constant current discharge reached 1.5 V are repeated for 50 cycles when the negative electrode active material is used to a lithium ion secondary battery.

2. The negative electrode active material according to claim 1, which has a total of three or more peaks, the remaining peaks attributable to one or more compounds selected from $SiO_2$, $Li_4SiO_4$, $Li_2O$, $Li_2CO_3$, and $Li_2Si_2O_3$.

3. The negative electrode active material according to claim 1, wherein the peak intensity A of a peak shown in a region of a bond energy ranging from 90 eV to 105 eV and the peak intensity B of a peak shown in a region of a bond energy of 106 eV or more in a Si 2p peak shape given in an X-ray photoelectron spectroscopy of the negative electrode active material satisfy a relationship that $0.3 \leq A/B \leq 3$.

4. The negative electrode active material according to claim 2, wherein the peak intensity A of a peak shown in a region of a bond energy ranging from 90 eV to 105 eV and the peak intensity B of a peak shown in a region of a bond energy of 106 eV or more in a Si 2p peak shape given in an X-ray photoelectron spectroscopy of the negative electrode active material satisfy a relationship that $0.3 \leq A/B \leq 3$.

5. The negative electrode active material according to claim 3, wherein the peak intensity A and the peak intensity B satisfy a relationship that $0.5 \leq A/B \leq 2$.

6. The negative electrode active material according to claim 1, wherein the full width at half maximum (2θ) of a diffraction peak near 38.2680° in an X-ray diffraction due to $Li_2SiO_3$ is 0.75° or more.

7. The negative electrode active material according to claim 2, wherein the negative electrode active material contains $Li_4SiO_4$, and the full width at half maximum (2θ) of a diffraction peak near 23.9661° in an X-ray diffraction due to $Li_4Sia_4$ is 0.2° or more.

8. The negative electrode active material according to claim 2, wherein the Li compounds giving the two or more peaks are substantially amorphous.

9. The negative electrode active material according to claim 1, wherein the negative electrode active material has a diffraction peak attributable to Si(111) crystal face in which the full width at half maximum (2θ) is 1.2° or more in an X-ray diffraction, and the size of the crystallite corresponding to the crystal face is 7.5 nm or less.

10. A method for producing a negative electrode active material according to claim 1, comprising a process of reforming,
    which includes subjecting silicon oxide powder to inner-bulk reforming, the inner-bulk reforming being carried out in an inner-bulk reforming apparatus comprising a bath filled with organic solvent, a positive electrode acting as a lithium source arranged in the bath and connected to one side of an electric source, a powder storage container arranged in the bath and connected to the other side of the electric source, and a separator provided between the positive electrode and the powder storage container, and in which said apparatus, Li is inserted electrochemically into the silicon-based material by adjusting insertion electric potential or elimination electric potential, or changing electric current density, bath temperature, or insertion and elimination times.

11. The method for producing a negative electrode active material according to claim 10, wherein the process of reforming includes a stage of inserting Li into the silicon-based material with conducting electric potential regulation and electric current regulation.

12. The method for producing a negative electrode active material according to claim 11, wherein the process of reforming further includes a stage of eliminating the inserted Li partially from the silicon-based material with conducting electric potential regulation and electric current regulation.

13. The producing method according to claim 12, wherein each of the stage of inserting Li and the stage of eliminating Li partially is repeated for plural times.

14. The method for producing a negative electrode active material according to claim 11, wherein the Li source used for inserting Li is one or more material selected from Li metal, lithium chloride, lithium carbonate, lithium oxide, and lithium composite oxide.

15. The method for producing a negative electrode active material according to claim 10, wherein
the method further includes a process of vapor phase growing the silicon-based material on a metal current collector with the surface being roughened; and
the process of reforming is carried out on the silicon-based material formed on the metal current collector.

16. A lithium ion secondary battery, comprising a negative electrode including a negative electrode current collector and the negative electrode active material layer containing the negative electrode active material according to claim 1.

17. The negative electrode active material according to claim 1, wherein the negative electrode active material has a median diameter of from 4 μm to 20 μm.

* * * * *